Oct. 1, 1957   R. BINDER   2,808,277
SEALING ARRANGEMENT FOR TELESCOPIC SHOCK ABSORBERS
Filed March 9, 1955
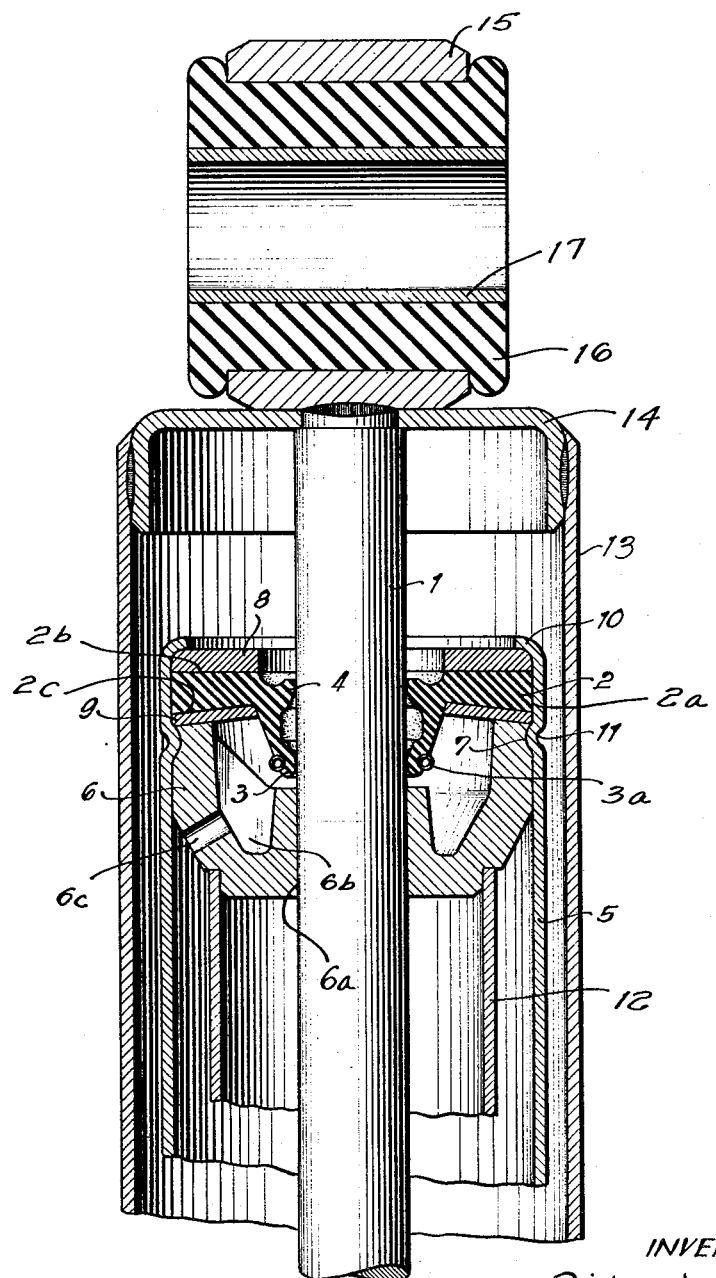
INVENTOR:
Richard Binder
By:
Michael S. Striker
agt.

United States Patent Office 2,808,277
Patented Oct. 1, 1957

2,808,277
SEALING ARRANGEMENT FOR TELESCOPIC SHOCK ABSORBERS

Richard Binder, Schweinfurt am Main, Germany, assignor to Firma Fichtel & Sachs A. G., Schweinfurt am Main, Germany Application March 9, 1955, Serial No. 493,182

Claims priority, application Germany March 12, 1954

6 Claims. (Cl. 286—26)

The present invention relates to a sealing arrangement, and more particularly to a sealing arrangement for telescopic shock absorbers.

It is the object of the present invention to provide a sealing arrangement for a shock absorber which permits a particularly economical manufacture.

It is another object of the present invention to provide in a shock absorber an annular sealing means which tightly seals along one edge thereof but permits sliding of a piston rod along another sealing edge thereof.

With these objects in view the present invention mainly consists in a sealing arrangement for a shock absorber and comprises, in combination, a tubular member having an inner cylindrical surface; a rod located within the tubular member; an annular resiliently deformable sealing means located between the rod and the tubular member and having an inner annular edge face engaging the rod and an outer annular edge face engaging the inner cylindrical surface of the tubular member; and pressure means mounted on the tubular member and engaging and compressing in longitudinal direction of the tubular member an annular portion of the sealing means located adjacent the outer annular edge face of the same whereby the outer annular edge face is firmly pressed against the inner cylindrical surface of the tubular member.

The annular sealing means has an outer diameter which substantially corresponds to the inner diameter of the tubular member and fits into the same with a slight play before it is compressed. Preferably the annular sealing means is compressed between two annular pressure plates, and the annular compressed portion of the sealing means between the pressure plates increases its thickness toward the outer annular sealing edge face.

According to a preferred embodiment of the invention, the pressure plates are pressed together between an inner flange of the tubular member and an annular pressure member which is held by an annular bead in the tubular member engaging an annular groove in the pressure plate member. The bead in the tubular member is formed simultaneously with the inner flange so that the sealing arrangement can be manufactured in a time-saving and economical operation without machining the parts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The drawing shows a longitudinal section through the device of the present invention.

Referring now to the drawing, the elongated piston rod member 1 is sealed by an annular sealing means 2 which has an inner annular edge face comprising two lips 3 and 4, and an outer annular edge face 2a engaging the inner cylindrical surface of the tubular container member 5. The transverse annular side face portions 2b and 2c which are located adjacent the edge face 2a are compressed between two annular plate members 8 and 9. The compressed annular portion of the sealing means 2 located between side face portions 2b, 2c thickens toward the outer sealing face 2a. A pressure member 6 has an annular portion engaging the pressure plate 9 and pressing the same against the annular sealing means 2 and toward the pressure plate 8 which abuts against the inner flange 10 of the tubular container member 5.

The annular pressure member is formed with an annular groove 7 which is engaged by an annular bead 11 in the tubular container member 5 and has an inner portion 6a provided with a bearing face on which the piston rod 1 is slidably mounted. The annular pressure member 6 has an inner chamber 6b communicating through a bore 6c with the interior of the tubular container member. Members 6, 8, 9 and 10 constitute pressure means for compressing the sealing means 2.

During the assembly of the parts, the inner flange 10 and the bead 11 are simultaneously formed by roller dies while the pressure member 6 compresses the sealing means 2. The outer diameter of the outer edge face 2a is slightly smaller than the inner surface of the tubular container member 5 as long as the sealing means 2 is not compressed, and consequently, the sealing means can be easily inserted. After the outer annular portion of the sealing means is compressed, the outer sealing face 2a is firmly pressed against the inner surface of the tubular container member 5 and provides a tight seal.

The bead 11 and the groove 7 provide an axial support of the annular member 6 which constitutes a bearing for the piston rod 1 so that axial forces occurring during operation of the shock absorber are taken up by the bead 11.

Two lips 3 and 4 are illustrated, but it will be understood that a single inner edge face could be provided on the sealing means. An annular means 3a holds the lip 3 in position.

The drawing further shows a tubular member 12 engaging the annular member 6 and forming a dampening chamber, an outer protective casing 13, a cap 14 fixedly connected to the protective casing 13, an annular member 15 for attaching the telescopic shock-absorber to a vehicle and engaging the unit 1, 14, 13, a rubber sleeve 16, and a steel sleeve 17 compressing the rubber sleeve 16.

It will be understood that each of the elements described above, or two or more together, may also find a useful application in other types of sealing arrangements differing from the types described above.

While the invention has been illustrated and described as embodied in a sealing arrangement for a telescopic shock-absorber, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a telescopic shock-absorber, a sealing arrangement comprising, in combination, a tubular container member having an inner cylindrical surface and an inturned flange at one end thereof; a cylindrical piston rod located within said tubular member coaxial with the same; a first annular pressure plate abutting against said inner flange and engaging said inner cylindrical surface of said tubular container member; an annular resiliently deformable sealing means located between said piston rod and said tubular container member and having an inner annular edge face slidably engaging said piston rod and an outer annular edge face engaging said inner cylindrical surface of said tubular container member, said annular sealing means abutting on one side thereof against said first annular pressure plate along an annular side face portion adjacent said outer sealing edge face; a second annular pressure plate located on the other side of said annular sealing means and engaging an opposite annular side face portion of the same adjacent said outer sealing edge face; an annular pressure member having an inner bore slidably supporting said piston rod and an outer surface engaging said inner surface of said tubular container member, said annular pressure member having an annular pressure face engaging said second annular pressure plate and urging the same against said annular sealing means and toward said first pressure plate whereby said outer annular edge face of said sealing means is firmly pressed against the inner cylindrical surface of said tubular container member; and attaching means attaching said annular pressure member to said tubular container member.

2. In a telescopic shock-absorber, a sealing arrangement, comprising, in combination, a tubular container member having an inner cylindrical surface and an inturned flange at one end thereof, said tubular container member being formed with an annular bead forming an inner annular projection on said inner cylindrical surface; a cylindrical piston rod located within said tubular member coaxial with the same; a first annular pressure plate abutting against said inturned flange and engaging said inner cylindrical surface of said tubular container member; an annular resiliently deformable sealing means located between said piston rod and said tubular container member and having an inner annular edge face slidably engaging said piston rod and an outer annular edge face engaging said inner cylindrical surface of said tubular container member, said annular sealing means abutting on one side thereof against said first annular pressure plate along an annular side face portion adjacent said outer sealing edge face; a second annular pressure plate located on the other side of said annular sealing means and engaging an opposite annular side face portion of the same adjacent said outer sealing edge face; an annular pressure member having an inner bore slidably supporting said piston rod and an outer surface engaging said inner surface of said tubular container member, said annular pressure member having an annular pressure face engaging said second annular pressure plate and urging the same against said annular sealing means and toward said first pressure plate whereby said outer annular edge face of said sealing means is firmly pressed against inner cylindrical surface of said tubular container member, said annular pressure member being formed on said outer surface thereof with an annular groove receiving said annular projection of said tubular container member whereby said annular pressure member is secured to said tubular container member.

3. In a telescopic shock-absorber, a sealing arrangement comprising, in combination, a tubular container member having an inner cylindrical surface and an inturned flange at one end thereof, said tubular container member being formed with an annular bead forming an inner annular projection on said inner cylindrical surface; a cylindrical piston rod located within said tubular member coaxial with the same; a first annular pressure plate abutting against said inturned flange and engaging said inner cylindrical surface of said tubular container member; an annular resiliently deformable sealing means located between said piston rod and said tubular container member and having an inner annular edge face slidably engaging said piston rod and an outer annular edge face engaging said inner cylindrical surface of said tubular container member, said annular sealing means abutting on one side thereof against said first annular pressure plate along an annular side face portion adjacent said outer sealing edge face; a second annular pressure plate located on the other side of said annular sealing means and engaging an opposite annular side face portion of the same adjacent said outer sealing edge face, the thickness of the portion of said annular sealing means between said annular side face portions increasing toward said outer annular edge face; an annular pressure member having an inner bore slidably supporting said piston rod and an outer surface engaging said inner surface of said tubular container member, said annular pressure member having an annular pressure face engaging said second annular pressure plate and urging the same against said annular sealing means and toward said first pressure plate whereby said outer annular edge face of said sealing means is firmly pressed against inner cylindrical surface of said tubular container member, said annular pressure member being formed on said outer surface thereof with an annular groove receiving said annular projection of said tubular container member whereby said annular pressure member is secured to said tubular container member.

4. A telescopic shock absorber as defined in claim 1, and said sealing means including an annular portion extending along said piston rod through the central opening of one of said annular pressure plates, said annular portion having an inner annular edge face engaging said piston rod.

5. A telescopic shock absorber as defined in claim 1, and said sealing means including an annular portion extending along said piston rod through the central opening of said second annular pressure plate, said annular portion having an inner annular edge face engaging said piston rod.

6. A telescopic shock absorber as defined in claim 1, and said sealing means including an annular portion extending along said piston rod through the central opening of one of said annular pressure plates, said annular portion having an inner annular edge face engaging said piston rod; and annular means surrounding said annular portion and holding said annular edge face thereof in engagement with said piston rod.

References Cited in the file of this patent

UNITED STATES PATENTS

| 2,094,752 | Rosenberry et al. | Oct. 5, 1937 |
| 2,106,293 | Christenson | Jan. 25, 1938 |
| 2,113,098 | Skinner | Apr. 5, 1938 |
| 2,443,145 | Payne | June 8, 1948 |
| 2,498,802 | Funkhouser | Feb. 28, 1950 |